3,810,942
ACETAMIDO NAPHTHYL OR ACETOPHENONE COMPOUNDS AND DERIVATIVES THEREOF
Henry E. Meunier, Grenoble, Isere, and Pierre L. Eymard, Fontaine, Isere, France, assignors to Laboratoires J. Berthier, Grenoble, France
No Drawing. Filed May 24, 1968, Ser. No. 786,509
Claims priority, application France, May 24, 1967, 107,590
Int. Cl. C07c 103/32, 103/34
U.S. Cl. 260—562 B                    8 Claims

ABSTRACT OF THE DISCLOSURE

Dipropylacetoxy and dipropylacetamido naphthyl or acetophenone compounds including the halogenated derivatives of the naphthyl compounds are disclosed as tranquilizing agents.

The present invention has for its object new medicaments endowed notably with tranquilizing properties, (1) Derivatives of naphthalene and di-n-propylacetic acid corresponding to the following general formula:

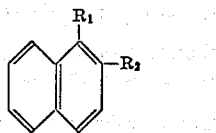

in which:

(a) $R_1$ represents a hydroxyl group substituted by a dipropylacetyl radical corresponding to the formula $$-O-CO-C(C_3H_7)_2$$
$$\qquad\qquad\quad |$$
$$\qquad\qquad\quad R'$$

in which R' represents an atom of hydrogen or halogen (Cl, Br, I, F)

$R_2$ represents an atom of hydrogen;

(b) $R_1$ represents an atom of hydrogen $R_2$ represents a hydroxyl group substituted by a dipropylacetyl radical corresponding to the formula $$-O-CO-C(C_3H_7)_2$$
$$\qquad\qquad\quad |$$
$$\qquad\qquad\quad R'$$

in which R' represents an atom of hydrogen or halogen (Cl, Br, I, F);

(c) $R_1$ represents an amino group substituted by a dipropylacetyl radical corresponding to the formula $$NH-CO-C(C_3H_7)_2$$
$$\qquad\qquad\quad |$$
$$\qquad\qquad\quad R'$$

in which R' represents an atom of hydrogen or halogen (Cl, Br, I, F)

$R_2$ represents an atom of hydrogen;

(d) $R_1$ represents an atom of hydrogen $R_2$ represents an amino group substituted by dipropylacetyl radical corresponding to the formula $$NH-CO-C(C_3H_7)_2$$
$$\qquad\qquad\quad |$$
$$\qquad\qquad\quad R'$$

in which R' represents an atom of hydrogen or halogen (Cl, Br, I, F);

in particular:

α-Naphthyldipropylacetate (Code No. BG 12 HK) corresponding to the formula

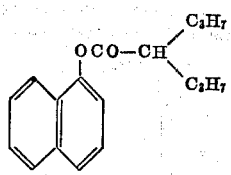

α-Naphthyldipropylacetamide (Code No. BG 11 HK) corresponding to the formula

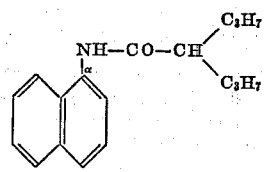

β-Naphthyldipropylacetate (Code No. BG 12 HL) corresponding to the formula

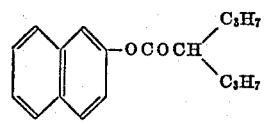

β-Naphthyldipropylacetamide (Code No. BG 11 HL) corresponding to the formula

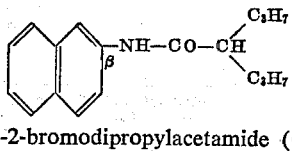

β-Naphthyl-2-bromodipropylacetamide (Code No. BH 11 HL) corresponding to the formula

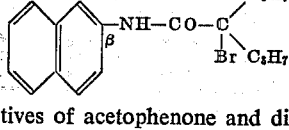

(2) Derivatives of acetophenone and di-n-propylacetic acid corresponding to the following general formula:

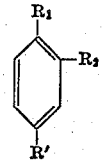

in which (a) $R_1$ represents an acetyl radical —CO—CH₃
$R_2$ represents an atom of hydrogen
R' represents: either a dipropylacetoxy group

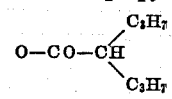

or a dipropylacetoxy group

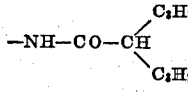

(b) $R_1$ represents an atom of hydrogen
$R_2$ represents an acetyl radical —CO—CH$_3$
R' represents: either a dipropylacetyl group

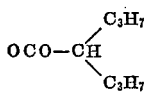

or a dipropylacetamide group

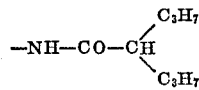

in particular p-dipropylacetamidoacetophenone (Code No. BG 11 KO) corresponding to the formula:

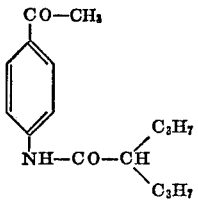

PROCEDURE FOR PREPARATION

The preparation of derivatives according to the invention is given in the following by way of examples. It should be understood, however, that they are not intended to limit the invention in any way.

EXAMPLE I

Naphthyldipropylaetamides

They are prepared by the action of 4.9 g. of dipropylacetyl chloride (30 millimoles) on 8.60 g. of β- or α-naphthylamine (60 millimoles), the reaction being carried out in the cold in 50 ml. of benzene.

After 15 minutes of contact, the precipitate of β- or α-naphthylamine hydrochloride is separated. The benzene solution is evaporated and the precipitate is purified by recrystallization in ethyl alcohol at 90° C. for β-naphthyldipropylacetamide and at 95° C. for the α-naphthyldipropylacetamide.

|  | α-naphthyldipropyl-acetamide | β-naphthyldipropyl-acetamide |
|---|---|---|
| Yield, percent | 55 | 81 |
| Melting point, °C | 149 | 145 |
|  | Theory / Result | Theory / Result |
| Analysis: |  |  |
| C | 80.29 / 80.28 | 80.29 / 80.16 |
| H | 8.55 / 8.64 | 8.55 / 80.74 |
| N | 5.20 / 5.21 | 5.20 / 5.00 |

EXAMPLE II

Naphthylhalogenodipropylacetamide

The procedure for preparation is identical. These compounds are obtained by the action of a millimole of 2-bromo, 2-chloro-, 2-fluoro- or 2-iodi-dipropylacetyl chloride on 2 millimoles of β- or α-naphthylamine.

In particular, for the preparation of β-naphthylbromodipropylacetamide, 7.30 g. of 2-bromodipropylacetyl chloride (30 millimoles) is reacted, under the same conditions as the preceding example, with 8.60 g. of β-naphthylamine (60 millimoles).

The product is recrystallized in alcohol at 95° C.

Yield _____percent__ 40
Melting point _____° C__ 92

*Analysis.*—Theory: C, 62.27; H, 6.05; N, 4.03. Result: C, 63.07; H, 6.06; N, 4.08.

EXAMPLE III

Naphthyl dipropylacetates

They are prepared by the action of 4.9 g. of dipropylacetyl chloride (30 millimoles) on 4.30 g. of β- or α-naphthol (30 millimoles), the reaction being effected by heating at reflux for two hours in the presence of 50 ml. of pyridine. The pyridine is finally eliminated by proceeding to a vacuum distillation by means of a water suction pump.

|  | α-naphthyl dipropyl-acetate | β-naphthyl dipropyl-acetate |
|---|---|---|
| Yield, percent | 50 | 76 |
| Boiling point, 20mm. Hg, °C | 185 | 180 |
|  | Theory / Result | Theory / Result |
| Analysis: |  |  |
| C | 79.94 / 79.00 | 79.94 / 80.15 |
| H | 8.14 / 7.67 | 8.14 / 7.75 |

EXAMPLE IV

Dipropylacetamidoacetophenone

The procedure for the preparation of dipropylacetamidoparaacetophenone is described by way of example.

It is prepared by the action of 4.9 g. of dipropylacetyl chloride (30 millimoles) on 8.10 g. of paraaminoacetophenone (60 millimoles) the reaction being carried out in the cold in 50 ml. of benzene.

After 15 minutes of contact, the precipitate of para-aminophenone hydrochloride is separated. The benzene solution is evaporated and the precipitate is purified by recrystallization in ethyl alcohol at 90° C.

Yield _____percent__ 45
Melting point _____° C__ 145

*Analysis.*—Theory: C, 73.52; H, 8.87; N, 5.36. Result: C, 73.06; H, 8.82; N, 5.75.

PHARMACOLOGICAL TESTS

For all the pharmacological tests, oily solutions at 20 mg./ml. in olive oil have been used for intraperitoneal injections.

Known products of reference have been used; meprobamate for so-called minor tranquilizing and chloropromazine for so-called major tranquilizing.

(1) Toxicity

The acute toxicity, LD$_{50}$, determined on the mouse, intraperitoneally, by the method of Karber and Behrens, is 580 mg./kg. for BG 11 HL. Under the same conditions it is about 600 mg./kg. for BG 11 HK, 1200 mg./kg. for BG 12 HL and for BG 12 HK. As for BH 11 HL the minimum lethal dose is above 1.5 g./kg. Finally, for BG 11 KO it is about 800 mg./kg.

The LD$_{50}$ of meprobamate, under the same conditions, is about 550 mg./kg.

(2) Potentiating action on hypnotics

Tests have been made to determine the potentiating action of BG 11 HL and BG 11 HK on Nembutal and on chloral by proceeding in the following manner:

With Nembutal: One injects 50 mg./kg. of BG 11 HL or BG 11 HK in oily solution into lots of 10 mice, intraperitoneally, a quarter of an hour before the subcutaneous injection of 40 mg./kg. of Nembutal in aqueous solution. One measures the time required to induce sleep and the duration of the sleep.

Upon awakening, the animals receive, intraperitoneally, another dose of 50 mg./kg. of BG 11 HL or BG 11 HK and the rapidity and duration of return to sleep is measured.

The activity of the products is compared to that of meprobamate tested under the same conditions at a dose of 100 mg./kg. intraperitoneally.

With chloral: Some lots of 10 mice receive, intraperitoneally, in oily solution, 50 mg./kg. of BG 11 HL or BG 11 HK and, a quarter of an hour later, 320 mg./kg. of chloral in the form of an aqueous solution of 30 mg./ml. As in the test with Nembutal, one measures the time required to fall asleep and the duration of the sleep.

The mice receive, likewise, upon awakening a new dose of 50 mg./kg. of BG 11 HL or BG 11 HK, and the rapidity and the duration of the resulting return to sleep is measured.

The results of the tests with Nembutal and with chloral are listed, as follows, in Tables I and II, respectively.

TABLE I

| Products lots of 10 mice | Average time to fall asleep | Average duration of sleep | Average time to fall asleep again | Duration of second sleep |
|---|---|---|---|---|
| Controls (nembutal alone) | 22 minutes, 36 seconds | 58 minutes, 36 seconds | | |
| BG 11 HL plus nembutal | 12 minutes, 36 seconds | 4 hours, 29 minutes | | |
| BG 11 HK plus nembutal | 11 minutes, 46 seconds | 4 hours, 16 minutes | | |
| Meprobamate plus nembutal | 12 minutes | 3 hours, 28 minutes | 12 minutes [1] | 1 hour, 12 minutes. |

[1] 5 animals fell asleep.

TABLE II

| Products lots of 10 mice | Average time to fall asleep | Average duration of sleep | Average time to fall asleep again | Duration of second sleep |
|---|---|---|---|---|
| Controls (chloral alone) | No sleep | No sleep | | |
| BG 11 HL plus chloral | 4 minutes, 26 seconds | 3 hours | | |
| BG 11 HK plus chloral | 4 minutes | do | | |

(3) Tranquilizing properties

The study of tranquilizing properties is made with the mouse which has been submitted to a series of tests currently employed in this field.

(a) Test of flight: This test shows the exploratory possibilities of the animals. One utilizes a plywood parallelepipedal box without a top in which is supported an inclined plane, likewise, of plywood covered with a fine grid. This plane has a horizontal reference line two centimeters underneath the support level at the edge of the box. The apparatus is placed in an artificially lighted place away from all shrill noise. A mouse "sortie" is one covering the distance from the reference line in the ascending direction.

The mice are introduced in groups of four and they are held at the bottom of the enclosure for 10 seconds by a removable board.

For each mouse one notes the time at the end of which the first "sortie" is effected and the total number of "sorties" per minute for five minutes. The effect of neprobamate, under the same conditions, is noted. The results of this test are listed in Table III.

(b) Test of the board with hole: This test allows a quantitative appreciation of the reaction of exploration as related to the curiosity of the animal.

The equipment consists of a board, 40 cm. x 40 cm. x 1.7 cm., in which there are sixteen holes of 3 cm. diameter.

This board is placed on four feet, sufficiently high (1.5 m.) so that the holes appear to be bottomless to the animals; the test is carried out in the greatest possible silence.

Each mouse is placed a the center of the board and one notes the number of times that it plunges it head into a hole. The number of holes explored at the end of 1, 2, 3, 4 and 5 minutes is recorded.

The results of this test are set forth in Table IV.

TABLE IV

| Lots of 25 animals | Average of the number of holes explored in— | | | | | Average of the total number of holes explored |
|---|---|---|---|---|---|---|
| | 1 min. | 2 min. | 3 min. | 4 min. | 5 min. | |
| Controls | 5.55 | 4.44 | 4.45 | 4.20 | 4.20 | 22.7 |
| BG 11 HL, 50 mg./kg | 3.37 | 3.04 | 2.54 | 2.55 | 1.82 | 13.47 |
| BG 11 HK, 50 mg./kg | 3.7 | 3.33 | 2.23 | 2.47 | 1.63 | 13.32 |
| BG 11 HK, 100 mg./kg | 3.27 | 2.50 | 1.96 | 1.93 | 1.50 | 11.16 |
| BG 11 HL, 100 mg./kg | 3.80 | 3.10 | 3.30 | 2.50 | 2.40 | 15 |
| BG 11 KO, 100 mg./kg | 2.68 | 2.95 | 2.36 | 1.73 | 1.95 | 11.68 |
| BG 12 HL, 100 mg./kg | 2.74 | 2.80 | 3.51 | 3.03 | 2.77 | 14.85 |
| BG 12 HK, 100 mg./kg | 3.40 | 3.60 | 4.10 | 3.25 | 2.85 | 17.30 |
| Meprobamate, 150 mg./kg | 2.80 | 2.16 | 2.32 | 2.32 | 2.32 | 12.4 |

(c) Chimney test: This test permits the determination of two groups of factors: (1) neuromuscular factors (muscular strength, agility, coordination of movement) and (2) psychic factors (curiosity, fright, instinct for flight).

It consists of introducing mice successively head first into a 30 cm. long upright cylinder gauged according to the shape of the mouse so that by a backwards sweeping motion it can escape in less than 30 seconds. The percentage of animals incapable of effecting this performance is noted. Meprobamate and chlorpromazine is tested under the same conditions in comparison with the prod-

TABLE III

| Lots of 32 animals | Time of "sortie" | Average of the "sorties" effected in— | | | | | Average of total number of "sorties" |
|---|---|---|---|---|---|---|---|
| | | 1 min. | 2 min. | 3 min. | 4 min. | 5 min. | |
| Controls | 22 seconds | 1.62 | 1.78 | 1.15 | 1.06 | 1.09 | 6.72 |
| BG 11 HL, 50 mg./kg | 26 seconds | 1.12 | 1.15 | 0.78 | 0.71 | 0.31 | 4.09 |
| BG 11 HK, 50 mg./kg | 36 seconds | 1.28 | 1.15 | 0.87 | 0.69 | 0.40 | 4.40 |
| BG 11 HK, 100 mg./kg | 1 minute, 2 seconds | 0.66 | 0.81 | 0.69 | 0.34 | 0.27 | 2.28 |
| BG 11 HK, 150 mg./kg | 1 minute, 37 seconds [1] | 0.45 | 0.30 | 0.25 | 0.25 | 0.25 | 1.53 |
| BH 11 HL, 100 mg./kg | 43 seconds | 1.21 | 1.21 | 0.91 | 0.72 | 0.56 | 4.62 |
| BH 11 HL, 200 mg./kg | 1 minute, 30 seconds | 1.15 | 1 | 0.60 | 0.55 | 0.40 | 3.80 |
| BG 11 KO, 100 mg./kg | 1 minute | 1.56 | 1.46 | 1.63 | 1.40 | 1.20 | 7.20 |
| BG 12 HL, 50 mg./kg | 40 seconds | 1.25 | 1.09 | 0.62 | 0.68 | 0.40 | 4.03 |
| BG 12 HK, 50 mg./kg | 1 minute, 13 seconds | 0.75 | 0.83 | 0.70 | 0.78 | 0.46 | 3.50 |
| Meprobamate, 150 mg./kg | 2 minutes, 1 second | 0.51 | 0.77 | 0.68 | 1.06 | 0.97 | 3.99 |

[1] 9 "sorties" only.

The effectiveness is noted, therefore, with reference to the doses used, of the products studied, which is clearly superior to that of meprobamate.

ucts. The results of this test are listed in Table V. The figures in the columns under "Time Elapsed Since Injection" give the percentage of mice which have failed the test, that is to say which have not succeeded in escaping from the cylinder in less than 30 seconds.

TABLE V

| Products, lots of 10 animals | Doses, mg./kg | Time elapsed since injection | | | | |
|---|---|---|---|---|---|---|
| | | 10 min. | 30 min. | 60 min. | 90 min. | 120 min. |
| Controls | | 0 | 0 | 0 | 0 | 0 |
| BG 11 HL | 50 i.p. | 50 | 50 | 60 | 60 | 50 |
| BG 11 HL | 100 i.p. | 40 | 100 | 100 | 60 | 50 |
| BG 11 HK | 100 i.p. | 50 | 80 | 90 | 70 | 70 |
| BG 12 HK | 100 i.p. | 30 | 60 | 60 | 30 | 30 |
| BG 12 HL | 100 i.p. | 30 | 50 | 60 | 40 | 30 |
| BG 11 HL | 200 i.p. | 40 | 40 | 40 | 60 | 20 |
| BG 11 KO | 200 i.p. | 10 | 40 | 70 | 80 | 80 |
| Meprobamate | 150 i.p. | 80 | 100 | 100 | 70 | 60 |
| Chlorpromazine | 10 v.o. | 100 | 100 | 100 | 100 | 90 |

(d) Rotating shaft test: This test of equilibrium determines the aptitude of the animals to coordinate their movements. It consists of determining the time during which mice remain on a wooden cylinder of 4.8 cm. diameter, rotating at a speed of four turns per minute. The cylinder presents a slightly rough surface so that the animals do not slide off.

The results obtained are listed in Table VI. The figures in the columns under "Time Elapsed Since Injection" give the percentage of mice that have failed the test, that is to say that do not remain on the cylinder at least two minutes after three trials.

TABLE VI

| Products, lots of 10 animals | Doses, mg./kg | Time elapsed since injection | | | | |
|---|---|---|---|---|---|---|
| | | 10 min. | 30 min. | 60 min. | 90 min. | 120 min. |
| Controls | | 0 | 0 | 0 | 0 | 0 |
| BG 11 HL | 50 i.p. | 10 | 0 | 0 | 0 | 0 |
| BG 11 HL | 100 i.p. | 10 | 0 | 0 | 0 | 0 |
| BG 11 HK | 100 i.p. | 0 | 20 | 10 | 0 | 0 |
| BG 12 HK | 100 i.p. | 0 | 0 | 0 | 0 | 0 |
| BG 12 HL | 100 i.p. | 0 | 0 | 0 | 0 | 0 |
| BG 11 HL | 200 i.p. | 0 | 0 | 10 | 10 | 0 |
| BG 11 KO | 200 i.p. | 10 | 10 | 0 | 0 | 0 |
| Meprobamate | 150 i.p. | 60 | 100 | 100 | 80 | 60 |

(e) Tests on the audiogenic crisis of the rat: Certain animal species are susceptible to respond to a resounding, shrill and prolonged stimulus by a convulsive crisis that is called "audiogenic crisis."

This crisis can be subdivided into three phases:

the animals run in a disorganized manner for 10 to 20 seconds, followed by a convulsive phase starting with a short clonic phase followed by a tonic phase with extension of the hind paws for 30 to 40 seconds.

finally there is an exhaustion phase lasting many minutes before the animals resume their normal state.

All the animals do not respond to the acoustic stimulus with an audiogenic crisis, one uses rats sensitized by I.N.H., the hydrazide of isonicotinic acid, at a dose of 200 mg./kg. in 4% solution.

Wistar rats have been used in this test, the females being more sensitive than the males.

The sound stimulus is obtained by means of a piercing electric bell.

The results are listed in Table VII.

(a) Test of the "waltzing" mice: The intraperitoneal injection of an aqueous solution of iminodipropionitrile (I.D.P.N.) in the following time sequence and dosage:

1 g./kg. the first day
1 g./kg. the second day
nothing the third day
1 g./kg. the fourth day induces, beginning with the fourth day, in the treated mice, a state of abnormal agitation, then in the following days an irreversible, hyperkinetic syndrome characterized by a circular running (waltzing mice) with a retro- and latero-displacements and with choreo-athetosic movements of the head. This condition is irreversible.

These animals are treated, comparatively, with BG 11 HL meprobamate and chlorpromazine, and an attempt is made to suppress this pathological syndrome.

In a lot of 10 waltzing mice having received 200 mg./kg. of BG 11 HL intraperitoneally, one mouse is not stopped. The other nine are stopped in an average of six minutes after the injection and resume turning spontaneously after three hours and five minutes on the average.

The resumption of activity has not been positive. At the end of a variable time, the mice are again left immobile for the duration of the observation (5 hours and 30 min.), only beginning to turn under the influence of a harmful stimulus.

In a lot of 10 waltinzg mice having received 200 mg./kg. of BH 11 HL intraperitoneally, one mouse was not stopped. The other nine were stopped in an average time period of 14 min. after the injection and resumed spontaneous turning after 24 min. and 36 sec., on the average.

In a lot of 10 waltzing mice having received 100 mg./kg. of meprobamate intraperitoneally, no mouse was stopped completely but they evidence, rather, periods of rest interrupted by short phases of resumption of activity.

On the average, the arrest is produced after 16 min. and the free resumption of circular movement is produced after 1 hour and 17 min. However, 2 mice were not arrested.

In a lot of 10 waltzing mice having received 100 mg./kg. of chlorpromazine intraperitoneally, all the mice were arrested in an average time of 10 min. after the injection and the circular movements returned only after 3 hours and 36 min.

(b) Antagonism with amphetamine—Effect on the toxicity of the group: One non-toxic dose of 30 mg./kg. of amphetamine sulfate, for example, administered intraperitoneally in aqueous solution, to mice placed in individual cages, can lead to increased mortality if the mice are placed in sufficient number in the same cage. Under the effect of the psychic excitation induced by the product the grouped mice became mutually maddened and end by dying of exhaustion and fear.

One has, therefore, sought to combat the effects of amphetamine by administering, ½ hour before, 100 mg./

TABLE VII

| Product | Dose, mg./kg. | I.N.H., i.p., mg./kg. | Number of rats | Complete crises | Incomplete crises | No crisis |
|---|---|---|---|---|---|---|
| Controls | 0 | 200 | 12 | 12 | | |
| BG 11 HL | 150 i.p. | 200 | 12 | 4 | 4 | 4 |
| BG 11 HL | 200 i.p. | 200 | 12 | 3 | 4 | 5 |

(4) Action on the central nervous system and neuroplegic properties

The action on the central nervous system is determined with the aid of the following tests:

kg. then 200 mg./kg. of BG 11 HL intraperitoneally in oily solution.

The same comparative experiment is carried out with meprobamate at a dose of 100 mg./kg.

The results of this experiment are listed in Table VIII.

TABLE VIII

| Product, lot of 10 grouped mice | Number of deaths in 20 hours | Percentage of deaths |
|---|---|---|
| Controls, amphetamine sulphate, 30 mg./kg. s.c. | 7 | 70 |
| BG 11 HL, 100 mg./kg. i.p. and amphetamine sulphate, ½ hr. later, 30 mg./kg. s.c. | 2 | 20 |
| BG 11 HL, 200 mg./kg. i.p. and amphetamine sulphate, ½ hr. later, 30 mg./kg. s.c. | 1 | 10 |
| Meprobamate, 100 mg./kg. i.p. and amphetamine sulphate, ½ hr. later, 30 mg./kg. s.c. | 9 | 90 |
| Meprobamate, 100 mg./kg. i.p. and amphetamine sulphate at same time, 30 mg./kg. s.c. | 4 | 40 |

(c) Test of resistance to asphyxia (test of Nassonof): The mice are placed, individually, in small hermetically sealed jelly jars and the time to death from asphyxia is noted.

Under these conditions it is noticed that the control animals die more rapidly than those that have received a dose of product which is capable of protecting their nerve cells against intoxication due to carbon dioxide and to the loss of oxygen.

A half hour before the test two lots of animals were treated with BG 11 HL in doses of 100 and 200 mg./kg. intraperitoneally, in oily solution, one lot of animals with BH 11 HL at a dose of 200 mg./kg. intraperitoneally and another lot with meprobamate at a dose of 200 mg./kg. by the same route, in aqueous solution.

The results obtained are listed in Table IX.

TABLE IX

| Products, lots of 10 mice: | Average time of death by asphyxia |
|---|---|
| Controls | 52 min. |
| BG 11 HL, 100 mg./kg. I.P. | 1 hour, 45 min. |
| BG 11 HL, 200 mg./kg. I.P. | 2 hours, 0.8 min. |
| BH 11 HL, 200 mg./kg. I.P. | 2 hours, 47 min. |
| Meprobamate, 200 mg./kg. I.P. | 1 hour, 42 min. |

(5) Conclusion of pharmacological tests

The esters, amides, and halogenated amides of di-n-propylacetic acid and of α- and β-naphthol or of acetophenone possess interesting pharmacological properties at doses sufficiently far from toxic doses, properties which tend to class them with the tranquilizers.

They possess an effect, in sufficient dose, of the properties of hypnotic potentiators. In the tests for tranquilizing activity the results obtained are occasionally comparable to those of meprobamate, often superior.

Finally, the results obtained in other tests, notably in the test with iminodipropionitrile, permit a glimpse of certain neuroplegic properties that would place the products midway between the so-called "minor" tranquilizers (meprobamate type) and the so-called "major" tranquilizers (chlorpromazine type).

CLINICAL OBSERVATIONS

Three examples demonstrating the tranquilizing effect of two products of the invention are cited by way of illustration and are not limiting.

Example I

An office employee, age 23 years, suffers from anxiety and insomnia. She receives a 300 mg. tablet of BG 11 HL in the morning, a 300 mg. tablet at noon and a 300 mg. tablet at night before bedtime.

A disappearance of anxiety accompanied by a resumption of sleep and a better stability of temper is noted.

Example II

A man, 54 years old, hypernervous, suffers at every attack of violent pain of angina accompanied by a sensation of suffocation. The administration of four 300 mg. tablets per day (2 in the morning, one at noon and one in the evening) of BG 11 HL produces the almost complete disappearance of these disorders with an improved objectivation of the state of affairs.

Example III

A 26 year old student suffering for several weeks from palpitations, from debilitation and from insomnia because of the approach of an important examination, receives three 300 mg. tablets of BG 11 HK per day, divided in two doses (one tablet in the morning and two tablets in the evening before bedtime).

The observed symptoms yield rapidly and the academic work can be pursued normally.

Others may practive the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A compound of the formulae:

(I) 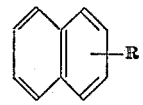

wherein R is dipropylacetamido of the formula

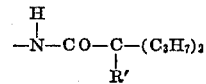

and R' is selected from the group consisting of hydrogen and halogen.

2. The compound I as defined in claim 1 wherein said R is said dipropylametamido and said R' is hydrogen.

3. The compound I as defined in claim 1 wherein said R is said dipropylacetamido and said R' is halogen.

4. The compound I as defined in claim 1 wherein said R is said dipropylacetamido and said R' is bromine.

5. The compound I as defined in claim 1 wherein said R is said dipropylacetamido and said R' is chlorine.

6. The compound I as defined in claim 1 wherein said R is said dipropylacetamido and said R' is fluorine.

7. The compound I as defined in claim 1 wherein said R is in the alpha position.

8. The compound I as defined in claim 1 wherein said R is in the beta position.

References Cited

Benoit-Guyod et al.: Chem. Abstracts, vol. 70 (1969), p. 253.

Underwood et al.: Jour. Amer. Chem. Soc., vol. 56 (1934), pp. 2117–2120.

Ruggli et al.: Chem. Abstracts, vol. 36 (1942), p. 415.

JAMES A. PATTEN, Primary Examiner

U.S. Cl. X.R.

260—479 R, 562 P; 424—311, 320

UNITED STATES PATENT OFFICE
CERTIFICATE OF CORRECTION

Patent No. 3,810,942  Dated May 14, 1974

Inventor(s) Henry E. Meunier and Pierre L. Eymard

It is certified that error appears in the above-identified patent and that said Letters Patent are hereby corrected as shown below:

Column 2, between line 60 and 65, "dipropylacetoxy" should read -- dipropylacetamide --.

Column 3, line 31 (title of Example I), "Naphthyldipropylaetamides" should read -- Naphthyldipropylacetamides --.

Column 6, line 27, "a" should read -- at --.

Column 6, line 28, "it" should read -- its --.

Table III, last column, 5th result, "1.53" should read --1.35 --.

Column 10, line 41, "dipropylametamido" should read -- dipropylacetamido --.

Signed and sealed this 18th day of March 1975.

(SEAL)
Attest:

RUTH C. MASON
Attesting Officer

C. MARSHALL DANN
Commissioner of Patents
and Trademarks